(12) United States Patent
Pedretti et al.

(10) Patent No.: US 12,494,261 B2
(45) Date of Patent: Dec. 9, 2025

(54) ANALOG CONTENT ADDRESSABLE MEMORY SATISFIABILITY SOLVER ACCELERATOR

(71) Applicant: Hewlett Packard Enterprise Development LP, Spring, TX (US)

(72) Inventors: Giacomo Pedretti, San Francisco, CA (US); Fabian Böhm, Boeblingen (DE); Thomas Van Vaerenbergh, Diegem (BE); Masoud Mohseni, Santa Barbara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 232 days.

(21) Appl. No.: 18/523,271

(22) Filed: Nov. 29, 2023

(65) Prior Publication Data
US 2025/0174289 A1 May 29, 2025

(51) Int. Cl.
*G11C 27/00* (2006.01)
*G06F 17/11* (2006.01)

(52) U.S. Cl.
CPC ............ *G11C 27/005* (2013.01); *G06F 17/11* (2013.01)

(58) Field of Classification Search
CPC .................. G11C 27/006; G06F 17/11
See application file for complete search history.

(56) References Cited

U.S. PATENT DOCUMENTS 6,987,684 B1 * 1/2006 Branth ............... G06F 11/1064
711/108
11,783,907 B2 * 10/2023 Pedretti .............. G11C 27/005
365/45

OTHER PUBLICATIONS

De Moura, L. et al., "Satisfiability Modulo Theories: Introduction and Applications," Communications of the ACM, vol. 54, No. 9, Sep. 2011, doi :10.1145/1995376.1995394, pp. 69-77.
Li, C. et al., "Analog content-addressable memories with memristors," Nature Communications, https://doi.org/10.1038/s41467-020-15254-4, published Apr. 2, 2020, 8 pages.

* cited by examiner

*Primary Examiner* — Vanthu T Nguyen
(74) *Attorney, Agent, or Firm* — Slater Matsil, LLP

(57) ABSTRACT

A satisfiability modulo theories (SMT) solver accelerator is implemented with analog content addressable memory (CAM) cells. A job-shop scheduling problem (JSSP) may be mapped to expression clauses that are stored in an analog CAM array. A test cycle may be performed by searching for a test vector of input variables in the analog CAM array, selecting a candidate variable of the test vector that is violating a largest number of the expression clauses, and changing the candidate variable of the test vector. The test cycle may be repeated until none of the expression clauses are violated by the test vector of the input variables. The resulting test vector of the input variables that violates no expression clauses is a solution for the JSSP.

13 Claims, 8 Drawing Sheets

ANALOG CONTENT ADDRESSABLE MEMORY SATISFIABILITY SOLVER ACCELERATOR

BACKGROUND

Satisfiability modulo theories (SMT) is a branch of logic and computer science that deals with determining the satisfiability of a given expression (e.g., mathematical expression, Boolean logic expression, etc.). The goal of solving an SMT problem is to determine if there exists an assignment of values to variables that satisfies a given expression. SMT solving has applications in high-performance computing fields such as statistical physics, hardware design and verification, software analysis and testing, cryptography, planning, scheduling, etc. An SMT solver accelerator is a specialized device (e.g., circuit, computer, etc.) that is adapted to determine the satisfiability of an expression input to the SMT solver accelerator. The demand for improved SMT solver accelerators has increased as the demand for high-performance computers has increased.

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

Figure 1:
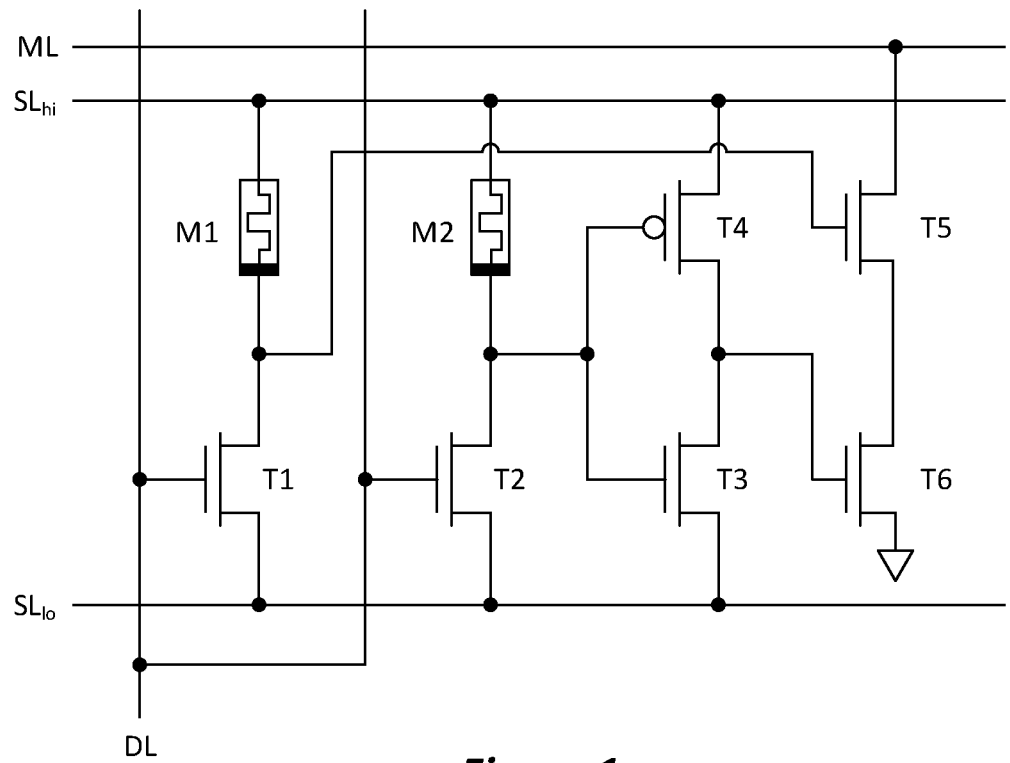
FIG. 1 shows an example of an analog CAM cell.

The following disclosure provides many different examples for implementing different features. Specific examples of components and arrangements are described below to simplify the present disclosure. These are, of course, merely examples and are not intended to be limiting.

A job-shop scheduling problem (JSSP) involves a number of jobs, each including a number of tasks that are to be performed consecutively on a number of machines. Solving a JSSP yields the starting times for each task on each machine that will optimally allocate the machines, such that all jobs are finished in the shortest possible time. A job-shop scheduling problem (JSSP) can be expressed as a type of satisfiability modulo theories (SMT) problem that includes a plurality of expression clauses. The optimal starting times for the JSSP may be calculated by determining a set of input variables that satisfy the expression clauses (e.g., do not violate any of the expression clauses). An SMT solver accelerator that is based on quadratic unconstrained binary optimization (QUBO) may be used to solve a JSSP, but the resources required by a QUBO-based SMT solver accelerator may be unacceptably large for a JSSP with a large number of jobs/machines.

Analog content addressable memory (CAM) can be expressed as a type of computing memory in which a range of values may be stored in an analog CAM cell. A lower limit and an upper limit of a variance range may be programmed for an analog CAM cell. An analog test value may be input to an analog CAM cell, and the output of the analog CAM cell indicates whether the test value is inside/outside of the stored variance range.

The present disclosure describes an SMT solver accelerator that can be implemented with analog CAM cells. The SMT solver accelerator may be a device that is dedicated to solving a JSSP. A JSSP may be mapped as a plurality of expression clauses, specifically, as multiple clauses in conjunctive normal form. A truth table that corresponds to the expression clauses of the JSSP may be stored in an analog CAM array. Specifically, each respective expression clause of the JSSP may be stored in a respective cell of the analog CAM array. A test vector of analog input variables may be tested with the analog CAM array. An expression clause stored in an analog CAM defines a constraint between a subset of the input variables. The output of a respective analog CAM cell indicates whether a respective subset of input variables satisfies the respective expression clause of the JSSP that is stored in that respective analog CAM cell. In this way, a solution for the JSSP may be tested by performing a one-shot search operation of the input variables in the analog CAM array.

The SMT solver accelerator may further include a counter circuit and a controller. The analog CAM cells of the analog CAM array may output indications off whether the input variables satisfy or violate the expression clauses stored in the analog CAM cells. The counter circuit counts the number of expression clauses (stored in the analog CAM array) that are violated for a given vector of input variables. Specifically, the counter circuit selects a candidate variable of the input variables that violates the largest number of the expression clauses. The controller repeatedly tests a vector of input variables with the analog CAM array, receives a candidate variable of that test vector of input variables from the counter circuit, updates the test vector of input variables by changing that candidate variable, and retests the test vector of input variables. This process may be repeated until none of the expression clauses (stored in the analog CAM array) are violated by the test vector of input variables. The resulting test vector of input variables that violates no expression clauses is a solution for the JSSP stored in the analog CAM array.

A JSSP may be expressed as the conjunction of several types of expression clauses. Specifically, there are four types of expression clauses that may be conjoined to express a JSSP. Equations 1-4 demonstrate the four types of expression clauses.

$$t_{i,j+1} \geq t_{i,j} + d_{i,j} \qquad (1)$$

$$(t_{i,j} \geq t_{i',j'} + d_{i',j'}) \vee (t_{i',j'} \geq t_{i,j} + d_{i,j}) \qquad (2)$$

-continued $$t_{i,1} \geq 0 \tag{3}$$

$$t_{i,m} + d_{i,m} \leq T_{max} \tag{4}$$

In the expression clause of Equation 1, $t_{i,j}$ is the start time of a task j within a job i on a machine, $d_{i,j}$ is the duration of the task j within the job i on the machine, and $t_{i,j+1}$ is the start time of a task j+1 within the job i on the machine. In the expression clause of Equation 2, $t_{i,j}$ is the start time of a task j within a job i on a machine, $d_{i,j}$ is the duration of the task j within the job i on the machine, $t_{i',j'}$ is the start time of a task j within a job i' on the machine, and $d_{i',j'}$ is the duration of the task j within the job i' on the machine. In the expression clause of Equation 3, $t_{i,1}$ is the start time of a first task within a job i on a machine. In the expression clause of Equation 4, $t_{i,m}$ is the start time of a final task within a job i on a machine, $d_{i,m}$ is the duration of the final task within the job i on the machine, and $T_{max}$ is the total duration of all jobs on all machines.

As subsequently described in greater detail, analog CAM cells may be programmed with variance ranges that correspond to expression clauses. The expression clauses may have the form of any of Equations 1-4. Thus, the expression clauses of a JSSP may be stored in an analog CAM array. A set of input variables for the JSSP may be tested (in the analog domain) by performing a search operation for the input variables in the analog CAM array.

FIG. 1 shows an example of an analog CAM cell 100. The analog CAM cell 100 is an OR-type analog CAM cell. An OR-type analog CAM cell stores a variance range and may be used to test whether a value is outside of the stored variance range. As used herein, a variance range refers to a range of voltages that is stored in an analog CAM cell 100, where the range of voltages is defined by an upper limit and a lower limit. As subsequently described in greater detail, the variance range stored in an analog CAM cell 100 may correspond to an expression clause of a JSSP.

In general, a CAM can be implemented in technologies that permit the CAM to store its contents, even when power is lost or otherwise removed. Thus, a CAM's data persists such that a CAM can act as a non-volatile memory. These technologies include, for instance, resistive switching memory (i.e., memristor), phase change memory, magnetoresistive memory, ferroelectric memory, some other resistive random access memory device, or combinations of those technologies.

The analog CAM cell 100 is shown as an example having a six-transistor-two-memristor (6T2M) circuit implementation. Specifically, the analog CAM cell 100 includes six transistors (e.g., T1-T6) and two memristors (e.g., a first memristor M1 and a second memristor M2). Further, the analog CAM cell 100 includes a match line node that is connected to a match line ML, a data line node that is connected to a data line DL, a high source line node that is connected to a high source line $SL_{hi}$ and a low source line node that is connected to a low source line $SL_{lo}$.

A memristor is a non-volatile electronic memory device, whose resistance can be programmed. Thus, analog values can be stored in (or encoded on) the analog CAM cell 100 by programming the conductances of the memristors M1/M2. The variance range stored in an OR-type analog CAM cell is defined by an upper limit (encoded by a conductance of the first memristor M1) and a lower limit (encoded by a conductance of the second memristor M2). The conductance of a memristor may be programmed by imposing a voltage (corresponding to the desired conductance) across the memristor. In the illustrated example, the transistors T1-T6 can be implemented as metal-oxide semiconductor field-effect transistors (MOSFETs), or the like.

The first memristor M1 is connected in series with the transistor T1, which can be considered as a memristor-transistor pair M1/T1. The second memristor M2 is connected in series with the transistor T2, which can be considered as a memristor-transistor pair M2/T2. The output of the memristor-transistor pair M1/T1 is connected to a gate of a pull-down transistor T5. The output of the memristor-transistor pair M2/T2 is inverted, via an inverter that includes transistors T3-T4, and the output of that inverter is connected to a gate of a pull-down transistor T6. The pull-down transistors T5-T6 are connected in series between the match line node (for the match line ML) and ground. Thus, the match line ML may only be pulled to ground if both of the pull-down transistors T5-T6 are turned on.

During a write operation, programming voltages are applied to the first memristor M1 and the second memristor M2 to program the variance range for the analog CAM cell 100. This is done by applying a voltage to the high source line $SL_{hi}$, to increase the conductance of the first memristor M1 and/or the second memristor M2, and applying a voltage to the low source line $SL_{lo}$, to decrease the conductance of the first memristor M1 and/or the second memristor M2. A voltage may also be applied to the data line DL during the write operation.

During a search operation, a voltage is applied to the low source line $SL_{lo}$ and the data line DL to provide the analog input data for comparison (in the analog domain) with the variance range stored in the first memristor M1 and the second memristor M2. The data line DL is electrically connected to a gate of the transistor T1 and to a gate of the transistor T2. Therefore, the analog CAM cell 100 receives the analog input data via the low source line $SL_{lo}$ and the data line DL, which is used to define a target value relating to the analog input data. Specifically, the target value is the difference between a voltage on the low source line $SL_{lo}$ and a voltage on the data line DL. Thus, the target value is the voltage across the low source line node (which is connected to the low source line $SL_{lo}$) and the data line node (which is connected to the data line DL). In operation, this target value is input via the low source line $SL_{lo}$ and the data line DL, and the analog CAM cell 100 matches when the target value is outside of the stored variance range, defined via the conductances of the first memristor M1 and the second memristor M2.

Whether a match is found between the analog input data (received via the low source line $SL_{lo}$ and the data line DL) and the variance range (stored in the memristors M1-M2) is indicated over the match line ML. The match line ML is pre-charged to a voltage $V_{ml}$ before a search operation begins. As the search operation is performed, the match line ML remains high (e.g., remains at the voltage $V_{ml}$) to indicate a match if the analog input data applied to the analog CAM cell 100 via the low source line $SL_{lo}$ and the data line DL is matched by the stored variance range that is encoded in the memristors M1-M2. Alternatively, if analog input data applied to the analog CAM cell 100 via the low source line $SL_{lo}$ and the data line DL is not matched by the stored variance range that is encoded in the memristors M1-M2, the match line ML goes low (e.g., the voltage $V_{ml}$ drops) to indicate a mismatch. The voltage $V_{ml}$ drops because a current in the match line ML discharges through both of the pull-down transistors T5-T6 to ground. For example, when a target value of analog input data applied to the analog CAM cell 100 via the low source line $SL_{lo}$ and the data line DL is lower than an upper limit of the variance range that is encoded by a conductance of the first memristor M1 and is also greater than a lower limit of the variance range that is encoded by a conductance of the second memristor M2, the voltage $V_{ml}$ drops as the current in the match line ML discharges through the pull-down transistors T5-T6.

Figure 2A:
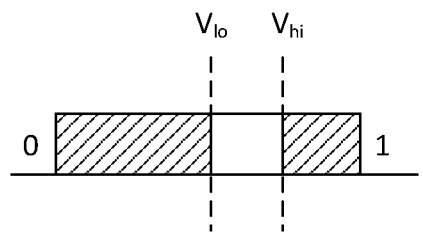
FIGS. 2A-2C show examples of variance ranges that may be stored in an OR-type analog CAM cell.
Figure 2B:
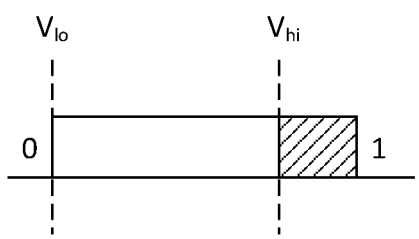
Figure 2C:
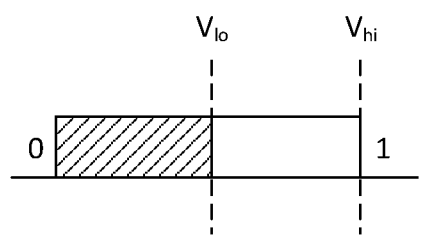

FIGS. 2A-2C show examples of variance ranges that may be stored in an OR-type analog CAM cell. As previously noted, a variance range refers to a range of voltages defined by an upper limit $V_{hi}$ and a lower limit $V_{lo}$. The lower limit $V_{lo}$ and the upper limit $V_{hi}$ may each be between a minimum value (e.g., 0) and a maximum value (e.g., 1), with the upper limit $V_{hi}$ being greater than the lower limit $V_{lo}$. The example variance ranges will be described in conjunction with FIG. 1. In FIGS. 2A-2C, the values corresponding to a match are shown with cross hatching.

In the example of FIG. 2A, the lower limit $V_{lo}$ and the upper limit $V_{hi}$ are each between the minimum value and the maximum value. The OR-type analog CAM cell may indicate a match if the target value is less than the lower limit $V_{lo}$ or is greater than upper limit $V_{hi}$ (in the analog domain). As a result, the OR-type analog CAM cell may be used to store an expression clause of a JSSP that includes two statements in disjunctive form, such as an expression clause corresponding to Equation 2. Specifically, in Equation 2, the voltage on the data line DL may correspond to $t_{i,j}$, the voltage on the low source line $SL_{lo}$ may correspond to $t_{i',j}$, the upper limit $V_{hi}$ may correspond to $d_{i',j}$, and the lower limit $V_{lo}$ may correspond to $-d_{i,j}$.

In the example of FIG. 2B, the upper limit $V_{hi}$ is between the minimum value and the maximum value, while the lower limit $V_{lo}$ is set to the minimum value. The OR-type analog CAM cell may indicate a match if the target value is greater than upper limit $V_{hi}$ (in the analog domain). As a result, the OR-type analog CAM cell may be used to store an expression clause of a JSSP that includes a greater than or equal to operation, such as an expression clause corresponding to Equation 1 or Equation 3. Specifically, in Equation 1, the voltage on the data line DL may correspond to $t_{i,j+1}$, the voltage on the low source line $SL_{lo}$ may correspond to $t_{i,j}$, and the upper limit $V_{hi}$ may correspond to $d_{i,j}$. Similarly, in Equation 3, the voltage on the data line DL may correspond to $t_{i,1}$, the voltage on the low source line $SL_{lo}$ may correspond to 0, and the upper limit $V_{hi}$ may correspond to 0.

In the example of FIG. 2C, the lower limit $V_{lo}$ is between the minimum value and the maximum value, while the upper limit $V_{hi}$ is set to the maximum value. The OR-type analog CAM cell may indicate a match if the target value is less than lower limit $V_{lo}$ (in the analog domain). As a result, the OR-type analog CAM cell may be used to store an expression clause of a JSSP that includes a less than or equal to operation, such as an expression clause corresponding to Equation 4. Specifically, in Equation 4, the voltage on the data line DL may correspond to $t_{i,m}$, the voltage on the low source line $SL_{lo}$ may correspond to 0, and the upper limit $V_{hi}$ may correspond to the difference between $T_{max}$ and $d_{i,m}$.

Figure 3:
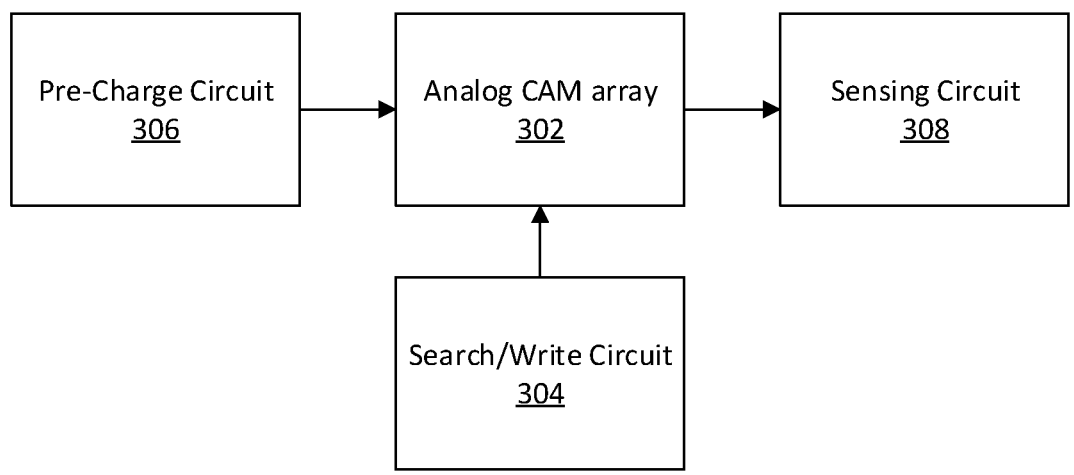
FIG. 3 is a block diagram of a content addressable memory device, according to some implementations.

FIG. 3 is a block diagram of an analog CAM device 300, according to some implementations. The analog CAM device 300 includes an analog CAM array 302 as well as multiple peripheral circuits used for programming and operating the analog CAM array 302. For example, the peripheral circuit may include a search/write circuit 304, a pre-charge circuit 306, and a sensing circuit 308.

The analog CAM array 302 includes multiple analog CAM cells, which may be arranged in rows and columns. As previously alluded to, the analog CAM cells can search multi-level voltages and stores analog values in a nonvolatile memory, such as memristors (or more generally, programmable resistors). A variance range can be programmed for each analog CAM cell of the analog CAM array 302, which can be implemented using a circuit that includes multiple memristors (e.g., the analog CAM cell 100 of FIG. 1). The analog CAM array 302 may be programmed to store expression clauses of a JSSP.

During a search operation, a search word of analog input data is communicated to the analog CAM array 302 over data lines. One or more analog CAM cells in the analog CAM array 302 (e.g., a row of analog CAM cells, also referred to as an analog CAM row) then indicates whether the values of the analog input data are matched by their stored variance ranges. The stored variance range encoded in an analog CAM cell is compared against a respective input data value of the search word. During a write operation, a stored word of analog input data is communicated to one or more analog CAM cells of the analog CAM array 302. The stored variance range in an analog CAM cell is encoded based on a respective input data value of the stored word.

The search/write circuit 304 performs a search operation or a write operation for the analog CAM array 302. The search/write circuit 304 may include a digital to analog converter (DAC). The DAC is used to apply write voltages to analog CAM cells of the analog CAM array 302 during a write operation, and to apply search voltages to analog CAM cells of the analog CAM array 302 during a search operation. The search/write operations may involve setting the appropriate analog voltage levels to represent the desired data patterns. For example, the DAC may apply write voltages to program the variance ranges for analog CAM cells of the analog CAM array 302, or may apply search voltages to test whether the search voltages are within the variance ranges programmed in analog CAM cells of the analog CAM array 302. Specifically, the search/write circuit 304 may apply voltages to the data line DL, the high source line $SL_{hi}$, and the low source line $SL_{lo}$ (see FIG. 1) for an analog CAM cell.

The pre-charge circuit 306 pre-charges a match line for one or more CAM cells of the analog CAM array 302 to a voltage $V_{ml}$ before a search operation begins. During a search operation, the match line of the analog CAM cells remains high (e.g., remains at the voltage $V_{ml}$) to indicate a match if the input data applied to the analog CAM cells is matched by the variance ranges stored in the respective analog CAM cells. Alternatively, the match line goes low (e.g., the voltage $V_{ml}$ drops) as a current in the match line discharges through pull-down transistors of an analog CAM cell to indicate a mismatch if analog input data applied to the analog CAM cells is not matched by the variance ranges stored in the analog CAM cells.

The sensing circuit 308 senses the outputs of the analog CAM cells of the analog CAM array 302. The sensing circuit 308 may include a sense amplifier for each analog CAM row. The match line of each analog CAM row is connected to a sense amplifier. The sense amplifier may be used during a search operation to detect if the match line of an analog CAM row is high (indicating a match with a search word) or low (indicating a mismatch with the search word).

The analog CAM device 300 may also include a controller (not separately illustrated) for controlling the components of the analog CAM device 300. For example, the controller may control the sensing circuit 308 and the search/write circuit 304. The controller may include a digital control circuit such as a microcontroller, an application-specific integrated circuit, or the like. The digital control circuit provides necessary control signals and data to the sensing circuit 308 and the search/write circuit 304. For example, the digital control circuit may be used to drive the DAC of the search/write circuit 304, as well as control and coordinate the operation of the DAC. The controller may include other components, such a clock circuit for temporalizing operations in the analog CAM device 300.

Figure 4:
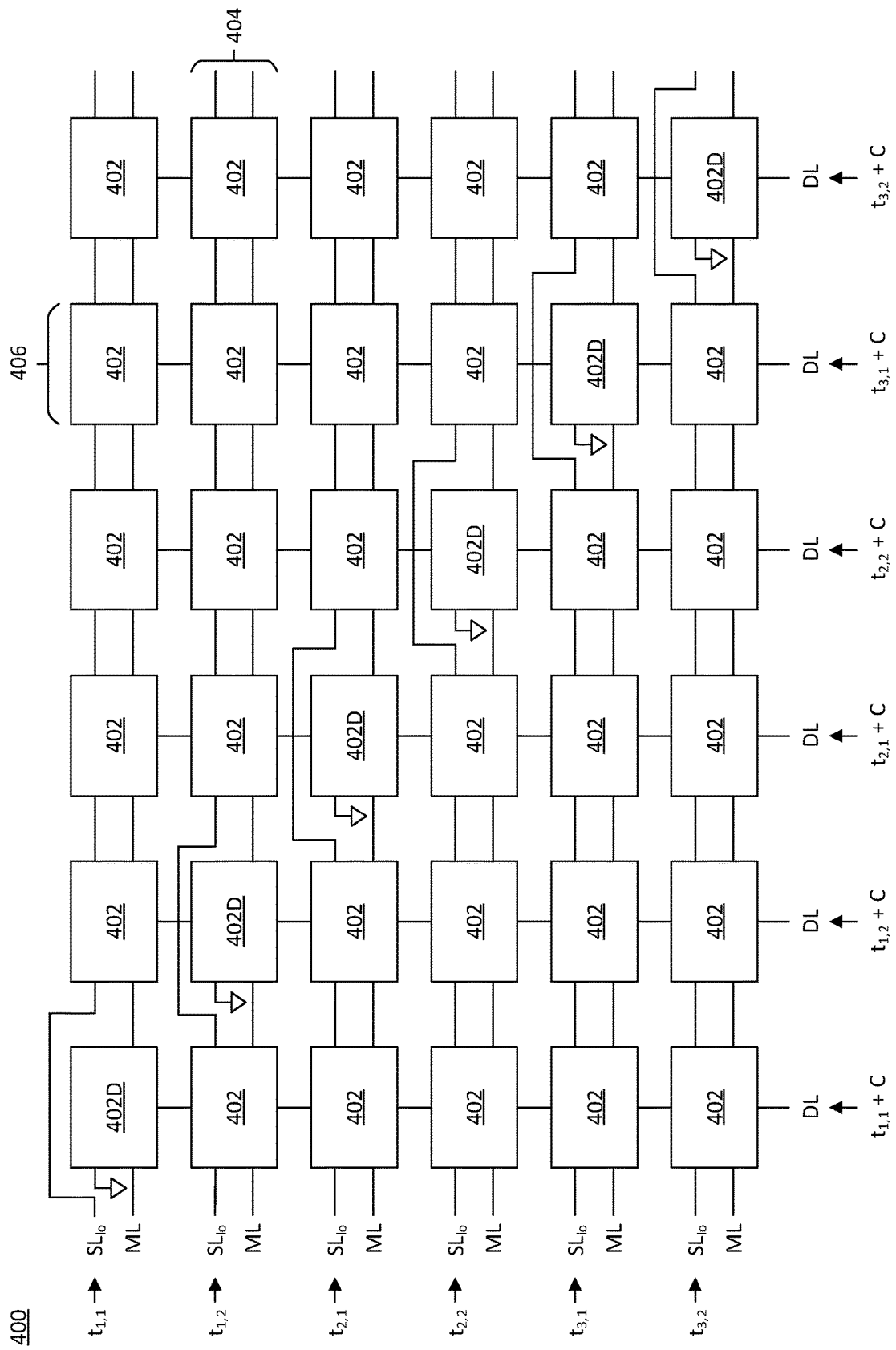
FIG. 4 is a schematic of an analog CAM array, according to some implementations.

FIG. 4 is a schematic of an analog CAM array 400, according to some implementations. The analog CAM array 400 may be utilized in an analog CAM device. For example, the analog CAM array 400 may be an example of an implementation of the analog CAM array 302 previously described for FIG. 3.

The analog CAM array 400 includes multiple analog CAM cells 402, which may be arranged in analog CAM rows 404 and analog CAM columns 406. The analog CAM cells 402 are OR-type analog CAM cells, and the analog CAM array is an OR-type analog CAM array. The OR-type analog CAM cells may be implemented using any suitable configuration, such as the configuration of the analog CAM cell 100 previously described for FIG. 1.

The analog CAM array 400 is configured to receive a plurality of input variables, which may correspond to variables of expression clauses (for a JSSP). In the illustrated example, the input variables include $t_{1,1}$, $t_{1,2}$, $t_{2,1}$, $t_{2,2}$, $t_{3,1}$, and $t_{3,2}$, which are the start times for particular tasks within particular jobs on particular machines (see Equations 1-4). The analog CAM cells 402 are configured to store the expression clauses, and to determine whether the input variables violate the expression clauses.

The quantity of analog CAM rows 404 is equal to the quantity of input variables, and the quantity of analog CAM columns 406 is equal to the quantity of input variables. The analog CAM array 400 includes data lines DL arranged along the analog CAM columns 406, match lines ML arranged along the analog CAM rows 404, and low source lines $SL_{lo}$ arranged along the analog CAM rows 404. The input variables are provided on respective one of the data lines DL, and are also provided on respective ones of the low source lines $SL_{lo}$.

Each match line ML is connected to the match line nodes of the analog CAM cells 402 along an analog CAM row 404. A match line ML remaining high during a search operation indicates that the expression clauses stored in that analog CAM row 404 are not violated by (e.g., are satisfied by) a vector of input variables.

Each data line DL is connected to the data line nodes of the analog CAM cells 402 along an analog CAM column 406. Each low source line $SL_{lo}$ is connected to the low source line nodes of the analog CAM cells 402 along an analog CAM row 404, except for the analog CAM cells 402D on a diagonal of the analog CAM array 400. The diagonal of the analog CAM array 400 refers to the diagonal in the schematic which extends from the upper-left to the bottom-right of the schematic. The analog CAM cells 402D on the diagonal are the analog CAM cells 402 at the intersections of the data lines DL and the low source lines $SL_{lo}$ that have the same input variable. Instead of being connected to respective low source lines $SL_{lo}$, the low source line nodes of the analog CAM cells 402D on the diagonal are connected to ground during a search operation. In this way, each analog CAM cell 402D on the diagonal will not receive the same input variable on both its data line DL and its low source line $SL_{lo}$. Put another way, a first subset of the analog CAM cells 402 are on the diagonal of the schematic (and have their low source line nodes connected to ground during the search operation) while a second subset of the analog CAM cells 402 are off the diagonal of the schematic (and have their low source line nodes connected to the low source lines $SL_{lo}$ during the search operation).

The input variables are provided on the data lines DL, and are also provided on the low source lines $SL_{lo}$. Each analog CAM row 404 receives, as input during a search operation, a respective input variable of the vector of input variables on a respective low source line $SL_{lo}$. Also, each analog CAM column 406 receives, as input during the search operation, a respective input variable of the vector of input variables on a respective data line DL. Thus, each analog CAM cell 402 receives, as input during the search operation, a different subset of the input variables. Specifically, the analog CAM cells 402 (except the analog CAM cells 402D on the diagonal) of the analog CAM array 400 receive, as input during the search operation, two of the input variables. Likewise, the analog CAM cells 402D on the diagonal of the analog CAM array 400 receive, as input during the search operation, one of the input variables.

In some implementations, the input variables provided on the data lines DL are offset by a constant C. This allows the variance range stored in an analog CAM cell 402 to include a negative value, even when the lower limit of the stored variance range is a positive voltage. The upper and lower limit of the variance range stored in an analog CAM cell 402 may thus be offset by the constant C.

The expression clauses of a JSSP may be stored in a first subset of the analog CAM cells 402 of the analog CAM array 400. As previously noted, an expression clause stored in an analog CAM cell 402 defines a constraint between some of the input variables. Specifically, an analog CAM cell 402 defines a constraint between the input variables that are provided to that analog CAM cell 402 (via its low source line $SL_{lo}$ and/or its data line DL). Only some permutations of the input variables may be constrained by the expression clauses of the JSSP. The JSSP may not include expression clauses that constrain other permutations of the input variables. The unconstrained permutations of the input variables correspond to a second subset of the analog CAM cells 402, which are unused. The variance ranges stored in the unused analog CAM cells 402 are set to the maximum upper/lower limits, so that the unused analog CAM cells 402 will indicate a match regardless of what inputs are provided to the unused analog CAM cells 402 during a search operation. In this way, the unused analog CAM cells 402 (which correspond to the unconstrained permutations of the input variables) are effectively ignored during the search operation.

Figure 5:
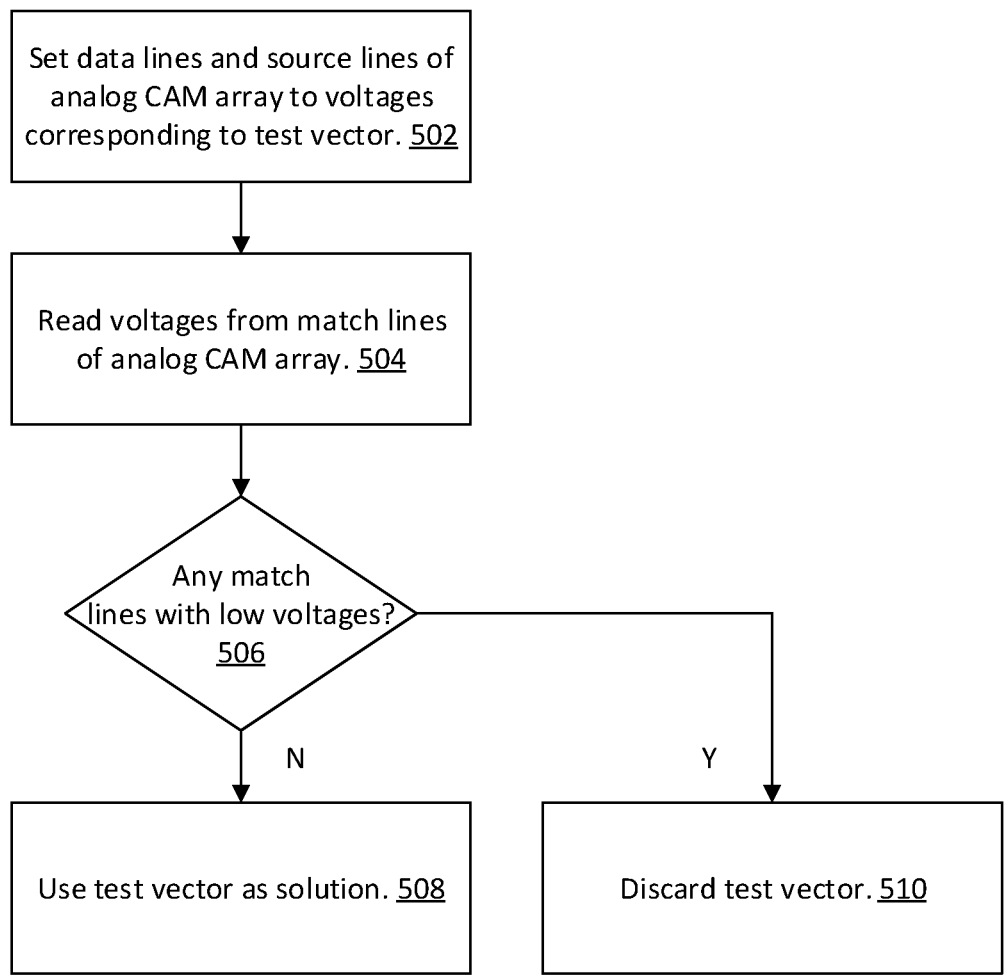
FIG. 5 is a diagram of an SMT solution testing method, according to some implementations.

FIG. 5 is a diagram of an SMT solution testing method 500, according to some implementations. The SMT solution testing method 500 will be described in conjunction with FIG. 4. The SMT solution testing method 500 may be performed by an SMT solver accelerator when using the analog CAM array 400 to test whether a vector of input variables satisfies (e.g., does not violate) expression clauses stored in the analog CAM array 400. The expression clauses may correspond to a JSSP. The testing is performed in the analog domain.

The SMT solver accelerator performs a step 502 of setting the data lines DL and the low source lines $SL_{lo}$ of the analog CAM array 400 to voltages that correspond to the test vector of input variables. As previously noted, each input variable is provided to a low source line $SL_{lo}$. Additionally, each input variable is provided to a data line DL, optionally with a constant offset.

The SMT solver accelerator performs a step 504 of reading voltages from the match lines ML of the analog CAM array 400. Each match line ML is a conjunction of the expression clauses stored in an analog CAM row 404. A match line ML having a high voltage indicates the input variables satisfy each of the expression clauses stored in its analog CAM row 404. A match line ML having a low voltage indicates the input variables violate at least one of the expression clauses stored in its analog CAM row 404.

The SMT solver accelerator performs a step 506 of determining whether there are any match lines ML with low voltages. In some implementations, a logical conjunction of the match lines ML may be determined. For example, the match lines ML may be connected to respective inverters, and a logical disjunction of the outputs of those inverters may be determined. That disjunction being false indicates there are no match lines ML with low voltages, while that disjunction being true indicates there is at least one match line ML with a low voltage.

Each of the match lines ML having a high voltage indicates the input variables satisfy each of the expression clauses stored in the analog CAM array 400. The SMT solver accelerator performs a step 508 of using the test vector of input variables as a solution for the JSSP, in response to each of the match lines ML having a high voltage. However, any of the match lines ML having a low voltage indicates the input variables violate at least one of the expression clauses stored in the analog CAM array 400. The SMT solver accelerator performs a step 510 of discarding the test vector of input variables (and not treating it as a solution for the JSSP), in response to any of the match lines ML having a low voltage.

Figure 6:
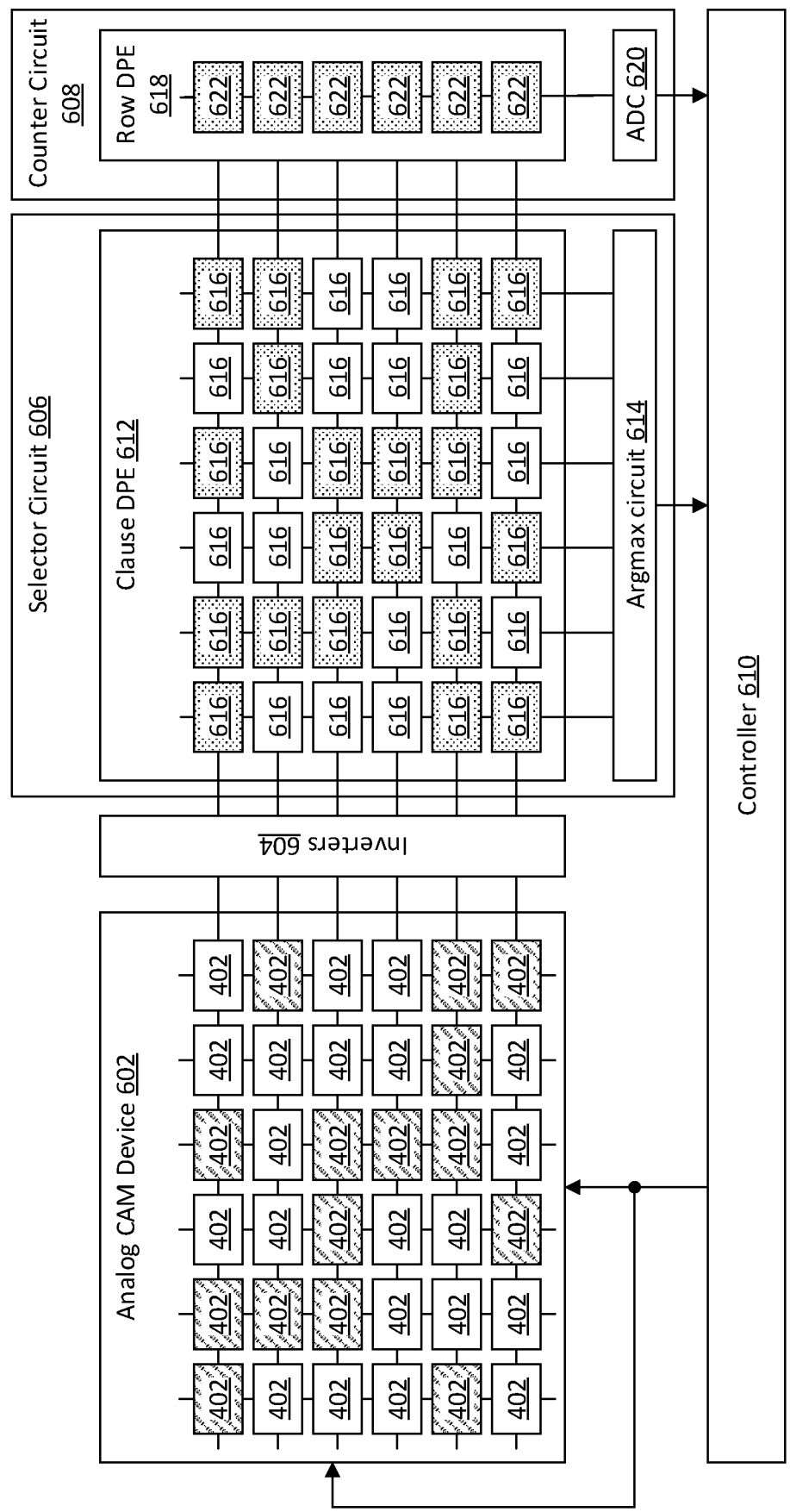
FIG. 6 is a diagram of an SMT solver accelerator, according to some implementations.

FIG. 6 is a diagram of an SMT solver accelerator 600, according to some implementations. The SMT solver accelerator 600 is based on analog CAM cells, and may be used to find a solution for a JSSP. Specifically, the JSSP may be mapped as a plurality of expression clauses, which are stored in analog CAM cells of the SMT solver accelerator 600. Test vectors of input variables (which are proposed solutions for the JSSP) may be tested by performing search operations in the analog CAM cells using the test vectors. The SMT solver accelerator 600 includes an analog CAM device 602, inverters 604, a selector circuit 606, a counter circuit 608, and a controller 610.

The analog CAM device 602 may be implemented using any suitable configuration, such as that previously described for FIG. 3. The analog CAM device 602 includes an analog CAM array of analog CAM cells 402. Each of the analog CAM cells 402 is configured to store a respective clause of a plurality of expression clauses (for the JSSP) and to determine whether a respective subset of the input variables violates the respective clause. Specifically, as previously described for FIG. 4, each analog CAM cell 402 receives, as input during a search operation, a first input variable of the input variables (on a low source line $SL_{lo}$) and/or a second input variable of the input variables (on a data line DL). An analog CAM cell 402 tests whether the input variable(s) it receives satisfies its stored clause. The analog CAM device 602 may perform the testing in the analog domain.

The analog CAM cells 402 of the analog CAM device 602 may be arranged in analog CAM rows and analog CAM columns. The input variables are provided to the analog CAM device 602 for a search operation. As a result of the search operation, a match line ML of an analog CAM row will either be at a high voltage (indicating that no clauses stored in the analog CAM cells 402 of that analog CAM row were violated) or a low voltage (indicating that at least one of the clauses stored in the analog CAM cells 402 of that analog CAM row were violated). The match lines ML from the analog CAM rows form an output vector.

The inverters 604 are connected to the outputs of the analog CAM device 602. Specifically, each inverter 604 is connected to the match line ML of an analog CAM row. An inverter 604 outputs a low voltage when the match line ML of its corresponding analog CAM row is high (indicating no clauses stored in the analog CAM cells 402 of the analog CAM row were violated). An inverter 604 outputs a high voltage when the match line ML of its corresponding analog CAM row is low (indicating at least one of the clauses stored in the analog CAM cells 402 of the analog CAM row were violated).

The selector circuit 606 is configured to select a candidate variable of the input variables that is violating a largest number of the expression clauses stored in the analog CAM device 602. Specifically, the selector circuit 606 calculates a violated clause vector, which indicates a number of the expression clauses violated by each of the input variables. Each element of the violated clause vector corresponds to a respective element (e.g., input variable) of the test vector of input variables, and indicates how many expression clauses that input variable is violating. The one of the input variables corresponding to a largest value of the violated clause vector is selected as the candidate variable. In some implementations, the selector circuit 606 includes a clause dot product engine 612 and an argmax circuit 614.

The clause dot product engine 612 includes a programmable crossbar array. The programmable crossbar array includes a number of programmable elements 616 that function together within an array to perform a weighted sum of the outputs of the inverters 604. The clause dot product engine 612 includes a plurality of input electrodes, a plurality of output electrodes, and plurality of programmable elements 616. The input electrodes are arranged in rows, the output electrodes are arranged in columns, and each programmable element 616 is positioned at a crosspoint or junction of an input electrode and an output electrode. As input, the clause dot product engine 612 takes a vector of signals (on the input electrodes) from the inverters 604, which is the output vector from the match lines ML of the analog CAM device 602. The output electrodes of the clause dot product engine 612 are connected to the argmax circuit 614.

The programmable elements 616 are circuit elements whose conductance is programmable. The programmable elements 616 are non-volatile analog devices. An example of a programmable element is a memristor, which includes a dielectric layer (e.g., an oxide layer) between two metal layers. When the programmable elements 616 are memristors, the programmable crossbar array is a memristor array. Other examples of programmable elements include multi-bit flash memory cells, phase-change random-access memory (PCRAM) cells, magnetoresistive random-access memory (MRAM) cells, electrochemical random-access memory (ECRAM) cells, and the like. The clause dot product engine 612 may also include other peripheral circuitry (not separately illustrated) associated with the programmable elements 616.

The clause dot product engine 612 includes N input electrodes and M output electrodes. Two main functions occur during the operation of the clause dot product engine 612. The first operation is to program the programmable elements 616 so as to map the mathematic values in an N×M matrix to the programmable elements 616. The N×M matrix may be stored by modifying the conductances of the programmable elements 616. The second operation is the dot product or vector-matrix multiplication operation. In this operation, input voltages are applied to the input electrodes and output currents are obtained from the output electrodes, corresponding to the result of multiplying an N×1 vector with the N×M matrix.

A vector-matrix multiplication may be executed through the clause dot product engine 612 by applying a set of voltages simultaneously along the input electrodes of the clause dot product engine 612 and collecting the currents through the output electrodes of the clause dot product engine 612. The signal generated on an output electrode is weighted by the corresponding conductances of the programmable elements 616 at the crosspoints of the output electrode with the input electrodes, and that weighted summation is reflected in the current at the output electrode. Thus, the relationship between the voltages at the input electrodes and the currents at the output electrodes is represented by a vector-matrix multiplication of the input vector with the N×M matrix determined by the conductances of the programmable elements 616. The vector-matrix multiplication is performed in the analog domain.

The clause dot product engine 612 is configured to store a weight matrix, and to generate a violated clause vector by multiplying the weight matrix with an output vector from the analog CAM rows (of the analog CAM device 602). The violated clause vector indicates a number of the expression clauses violated by each of the input variables. The violated clause vector is then fed (via the output electrodes of the clause dot product engine 612) into the argmax circuit 614.

The weight matrix stored in the clause dot product engine 612 is an N×M matrix that includes low values (e.g., zeros) and high values (e.g., ones). The values of the weight matrix correspond to the analog CAM cells 402 that store expression clauses for a JSSP. As previously noted, the expression clauses of a JSSP may be stored in a subset of the analog CAM cells 402 of an analog CAM array. The remaining analog CAM cells 402 of the analog CAM array are not used to store expression clauses of the JSSP. Each programmable element 616 of the clause dot product engine 612 corresponds to an analog CAM cell 402 of the analog CAM device 602, in a schematic view. The programmable elements 616 corresponding to the used analog CAM cells 402 have a conductance corresponding to a high value. Additionally, the programmable elements 616 along both diagonals of the clause dot product engine 612 in the schematic are set to a conductance corresponding to a high value. The remaining the programmable elements 616 have a conductance corresponding to a low value.

The argmax circuit 614 is connected to the output electrodes of the clause dot product engine 612. The argmax circuit 614 is configured to select the largest value of the violated clause vector. The argmax circuit 614 indicates the selected value of the violated clause vector to the controller 610. The selected value of the violated clause vector corresponds to an input variable of the test vector of input variables. As subsequently described in greater detail, the controller 610 will treat that corresponding input variable a candidate variable for modification. Because the candidate variable is violating the largest number of the expression clauses stored in the analog CAM cells 402, changing the candidate variable of the test vector may be more likely to produce a valid solution for the JSSP stored in the analog CAM device 602. In other words, the candidate variable is an "educated guess" of which variable of the test vector should be changed. As subsequently described in greater detail, the controller 610 solves a JSSP by repeatedly identifying and changing candidate variables of a test vector, in an iterative manner, until a test vector that satisfies all expression clauses is found.

In some implementations, the argmax circuit 614 includes a winner-takes-all circuit. The winner-takes-all circuit selects, as output, the largest value of the violated clause vector. The argmax circuit 614 may also include a noise generator circuit. The noise generator circuit is configured to add noise to the violated clause vector before the winner-takes-all circuit selects the largest value of the violated clause vector. Adding noise to the violated clause vector may help avoid getting stuck in a local minima when iteratively solving a JSSP.

The counter circuit 608 is configured to count the number of the analog CAM rows (of the analog CAM device 602) with match lines ML having a low voltage. In other words, the counter circuit 608 counts the number of analog CAM rows that have analog CAM cells 402 storing expression clauses violated by the input variables. In some implementations, the counter circuit 608 includes a row dot product engine 618 and an analog-to-digital converter 620.

The row dot product engine 618 includes a programmable crossbar array, which may have a similar structure and function as the clause dot product engine 612. In some implementations, the row dot product engine 618 and the clause dot product engine 612 may be part of the same programmable crossbar array. The row dot product engine 618 stores an N×1 weight vector. The row dot product engine 618 is configured generate a value by multiplying the weight vector with an output vector from the analog CAM rows (of the analog CAM device 602). The vector-vector multiplication is performed in the analog domain. The resulting value is an analog signal that represents the number of the analog CAM rows with analog CAM cells having expression clauses violated by the input variables.

The analog-to-digital converter 620 is connected to the row dot product engine 618. The analog-to-digital converter 620 receives the analog signal from the row dot product engine 618 and converts it to a digital value. The digital value indicates the number of the analog CAM rows (of the analog CAM device 602) having expression clauses violated by the input variables.

The controller 610 is configured to control the components of the SMT solver accelerator 600 to solve a JSSP. Specifically, the controller 610 is configured to iteratively perform test cycles. A test cycle includes providing a test vector of input variables to the analog CAM device 602 and then receiving (from the selector circuit 606) the candidate variable of the test vector that is violating a largest number of the expression clauses stored in the analog CAM device 602. The candidate variable is then changed to produce an updated test vector of the input variables. The test cycle may then be repeated, e.g., by providing the updated test vector of input variables to the analog CAM device 602 and then receiving (from the selector circuit 606) the candidate variable of the updated test vector that is violating a largest number of the expression clauses stored in the analog CAM device 602. Specifically, the test cycle is repeated until none of the expression clauses are violated by the test vector of the input variables. The output of the counter circuit 608 being zero indicates that none of the expression clauses are violated by the test vector. The test vector, at that point, is a solution for the JSSP.

Figure 7:
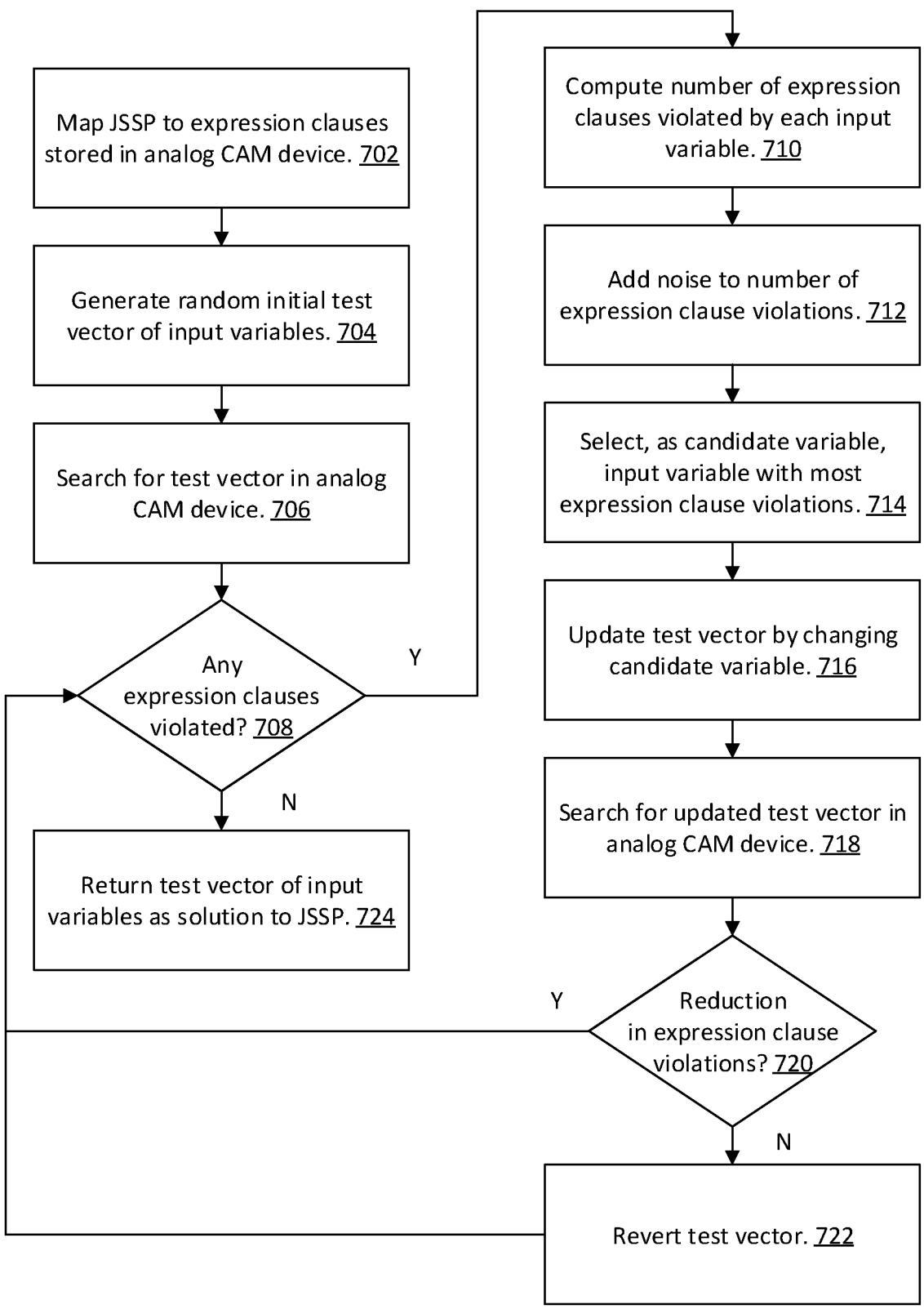
FIG. 7 is a diagram of an SMT solving method, according to some implementations.

FIG. 7 is a diagram of an SMT solving method 700, according to some implementations. The SMT solving method 700 will be described in conjunction with FIG. 6. The SMT solving method 700 may be performed by the controller 610 of the SMT solver accelerator 600 to find a vector of input variables that satisfies (e.g., does not violate) expression clauses stored in the analog CAM device 602. The expression clauses may correspond to a JSSP, and the resulting vector of input variables is a solution for the JSSP.

The controller 610 performs a step 702 of mapping the JSSP to expression clauses that are stored in the analog CAM device 602. Specifically, each expression clause is stored in an OR-type analog CAM cell of the analog CAM device 602, in a similar manner as previously described. The analog CAM device 602 may be programmed with values corresponding to the expression clauses. The clause dot product engine 612 may also be programmed. Specifically, the weight matrix stored in the clause dot product engine 612 corresponds to the analog CAM cells 402 that store the expression clauses for the JSSP. In the illustrated example of FIG. 6, the analog CAM cells 402 that store expression clauses are shown with cross hatching, while the programmable elements 616 that have a high value (corresponding to the used analog CAM cells 402) are shown with dotted hatching. The unused analog CAM cells 402 and the programmable elements 616 that have a low value (corresponding to the unused analog CAM cells 402) are shown without hatching. The programming of the CAM device 602 and the clause dot product engine 612 may be performed once for a solving operation.

The controller 610 performs a step 704 of generating a test vector of input variables. The test vector is an initial set of values for the input variables. The initial test vector may be randomly generated.

The controller 610 performs a step 706 of searching for the test vector in the analog CAM device 602. The test vector is provided as inputs to the analog CAM array, e.g., on the data lines DL and the low source lines $SL_{lo}$ of the analog CAM device 602. When the analog CAM array is arranged in rows, each of the analog CAM rows may be searched for the test vector.

As previously noted, the values provided to an analog CAM cell via a data line DL and a low source lines $SL_{lo}$ collectively define a target value for lookup in the analog CAM cell. An OR-type analog CAM cell keeps its respective match line ML high when a target value is outside of the variance range stored in the analog CAM cell. The match line ML of an analog CAM row remaining high during the search operation indicates that the values of the test vector are outside of the variance ranges stored in the analog CAM cells of that analog CAM row. Each of the match lines ML of the analog CAM device 602 remaining high during the search operation indicates that no expression clauses were violated, while any match lines ML going low indicates that at least one of the expression clauses were violated.

The controller 610 performs a step 708 of determining whether any expression clauses (stored in the analog CAM device 602) were violated by the test vector of input variables. Determining whether any expression clauses were violated by the test vector may be performing using the counter circuit 608. For example, a digital value may be obtained from the analog-to-digital converter 620. The value being zero indicates that no expression clauses were violated. The value being greater than zero indicates that at least one expression clause was violated.

In response to there being expression clauses violated by the test vector of input variables, one or more iterations of a test cycle may be performed. The test cycle includes providing a test vector to the analog CAM device 602, identifying a candidate variable of the test vector to change, and changing the candidate variable in the test vector. This may be performed using, among other components, the selector circuit 606.

The controller 610 performs a step 710 of computing the number of expression clauses violated by each input variable of the test vector. The clause dot product engine 612 may be used to compute that number. Specifically, the clause dot product engine 612 multiplies its stored weight matrix with the output vector from the analog CAM rows of the analog CAM device 602. The resulting vector is a violated clause vector, where each element of the violated clause vector corresponds to a respective element of the test vector provided to the analog CAM device 602. The value of each element of the violated clause vector indicates how many expression clauses (in the analog CAM device 602) were violated by the corresponding value of the test vector.

The controller 610 performs a step 712 of adding noise to the numbers computed in step 710. Noise may be added to the violated clause vector. Adding noise to the violated clause vector may help avoid getting stuck in a local minima.

The controller 610 performs a step 714 of selecting, as a candidate variable, the input variable with the most expression clause violations. Specifically, a largest value of the violated clause vector may be selected, and then the value of the test vector that corresponds to that selected value of the violated clause vector may be treated as the candidate variable. Because the candidate variable is the variable of the test vector that is violating the most expression clauses, changing the candidate variable is likely to reduce the number of violated expression clauses.

The controller 610 performs a step 716 of updating the test vector by changing the candidate variable. The candidate variable may be changed by generating a new random value for the candidate variable. The candidate variable may be changed by incrementing the candidate variable. The candidate variable may be changed by decrementing the candidate variable. Other acceptable techniques could be used to change the candidate variable.

The controller 610 performs a step 718 of searching for the updated test vector in the analog CAM device 602. The updated test vector is provided as inputs to the analog CAM array, e.g., on the data lines DL and the low source lines $SL_{lo}$ of the analog CAM device 602. When the analog CAM array is arranged in rows, each of the analog CAM rows may be searched for the updated test vector.

The controller 610 performs a step 720 of determining whether the updated test vector violates fewer expression clauses than the previous test vector. This may be performing using the counter circuit 608. For example, a digital value may be obtained from the analog-to-digital converter 620 once when searching for the previous test vector (in step 706) and again when searching for the updated test vector (in step 718). The digital value may indicate how many analog CAM rows of the analog CAM device 602 contain violated expression clauses. The digital value being smaller for the updated test vector that for the previous test vector indicates that the updated test vector violates fewer expression clauses than the previous test vector.

The controller 610 performs a step 722 of reverting the updated test vector to the previous test vector, in response to the updated test vector not violating fewer expression clauses than the previous test vector. For example, if the updated test vector violates the same (or a larger) number of expression clauses than the previous test vector, then the updated test vector is reverted. Reverting the updated test vector includes discarding the updated test vector and using the previous test vector for the next iteration of the test cycle. Alternatively, the updated test vector is used for the next iteration of the test cycle, in response to the updated test vector violating fewer expression clauses than the previous test vector.

The process described for steps 708-722 may be repeated until no expression clauses are violated by the test vector. The process may be iteratively performed until the test vector converges on a solution for the JSSP. In some implementations, the process is limited to a maximum quantity of iterations. If the test vector does not converge on a solution for the JSSP within the maximum quantity of iterations, then the controller 610 may terminate the process. The process being terminated may indicate that no solution for the JSSP exists.

The controller 610 performs a step 724 of returning the test vector as a solution for the JSSP, in response to no expression clauses being violated by the test vector. For example, the test vector may be returned to a system implementing the SMT solver accelerator 600.

Figure 8:
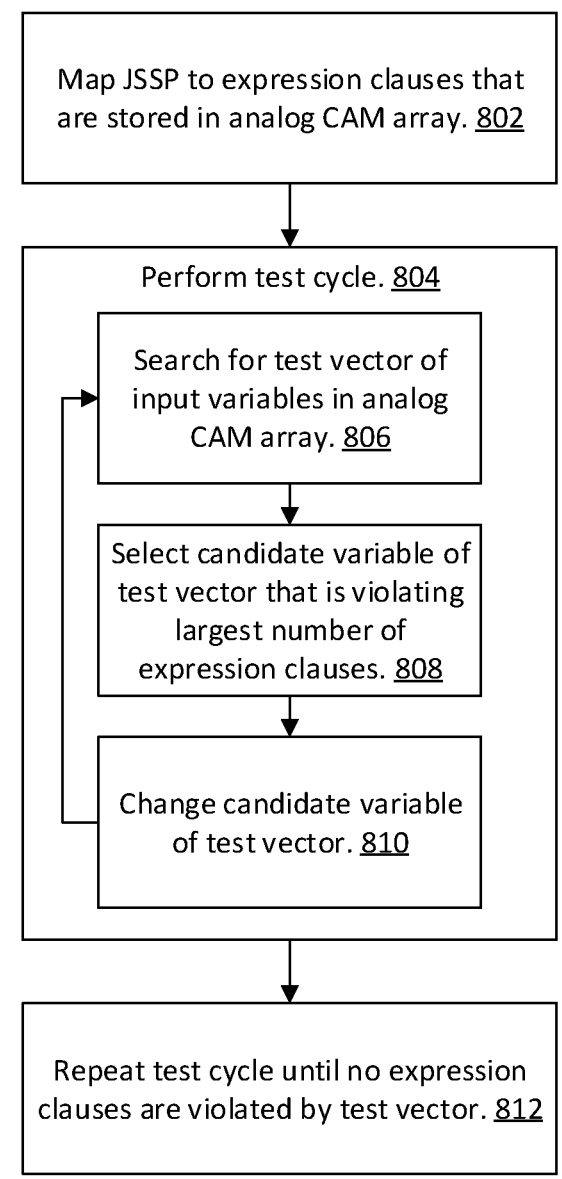
FIG. 8 is a diagram of an SMT solving method, according to some implementations.

FIG. 8 is a diagram of an SMT solving method 800, according to some implementations. The SMT solving method 800 will be described in conjunction with FIG. 6. The SMT solving method 800 may be performed by the controller 610 of the SMT solver accelerator 600.

The controller 610 performs a step 802 of mapping a JSSP to expression clauses that are stored in an analog CAM array of an analog CAM device 602. The controller 610 performs a step 804 of performing a test cycle. As previously noted, the test cycle includes multiple steps that are performed iteratively. The controller 610 performs a step 806 of searching for a test vector of input variables in the analog CAM array of the analog CAM device 602. The controller 610 performs a step 808 of selecting a candidate variable of the test vector that is violating a largest number of the expression clauses. The candidate variable of the test vector may be selected by computing a number of the expression clauses violated by each of the input variables of the test vector; adding noise to the number of the expression clauses for each of the input variables; and selecting, as the candidate variable, one of the input variables having the largest number of the expression clauses violated. The controller 610 performs a step 810 of changing the candidate variable of the test vector. The candidate variable may be changed by generating a new random value for the candidate variable, incrementing the candidate variable, decrementing the candidate variable, or the like. The controller 610 performs a step 810 of repeating the test cycle (e.g., steps 806-810) until none of the expression clauses are violated by the test vector of the input variables.

Figure 9:
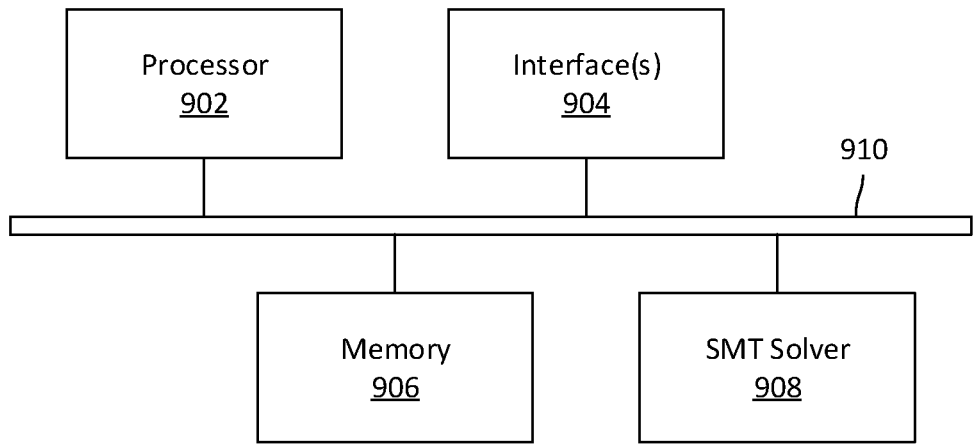
FIG. 9 is a block diagram of a computing system, according to some implementations.

FIG. 9 is a block diagram of a computing system 900, which can be used to operate an SMT solver accelerator as previously described. The computing system 900 may be implemented in an electronic device. Examples of electronic devices include servers, desktop computers, laptop computers, mobile devices, gaming systems, and the like.

The computing system 900 may be utilized in any data processing scenario, including stand-alone hardware, mobile applications, or combinations thereof. Further, the computing system 900 may be used in a computing network, such as a public cloud network, a private cloud network, a hybrid cloud network, other forms of networks, or combinations thereof. In one example, the methods provided by the computing system 900 are provided as a service over a network by, for example, a third party. The computing system 900 may be implemented on one or more hardware platforms, in which the modules in the system can be executed on one or more platforms. Such modules can run on various forms of cloud technologies and hybrid cloud technologies or be offered as a Software-as-a-Service that can be implemented on or off a cloud.

To achieve its desired functionality, the computing system 900 includes various hardware components. These hardware components may include a processor 902, one or more interface(s) 904, a memory 906, and an SMT solver accelerator 908. The hardware components may be interconnected through a number of busses and/or network connections. In one example, the processor 902, the interface(s) 904, the memory 906, and the SMT solver accelerator 908 may be communicatively coupled via a bus 910.

The processor 902 retrieves executable code from the memory 906 and executes the executable code. The executable code may, when executed by the processor 902, cause the processor 902 to implement any functionality described herein. The processor 902 may be a microprocessor, an application-specific integrated circuit, a microcontroller, or the like.

The interface(s) 904 enable the processor 902 to interface with various other hardware elements, external and internal to the computing system 900. For example, the interface(s) 904 may include interface(s) to input/output devices, such as, for example, a display device, a mouse, a keyboard, etc. Additionally or alternatively, the interface(s) 904 may include interface(s) to an external storage device, or to a number of network devices, such as servers, switches, and routers, client devices, other types of computing devices, and combinations thereof.

The memory 906 may include various types of memory modules, including volatile and nonvolatile memory. For example, the memory 906 may include Random Access Memory (RAM), Read Only Memory (ROM), a Hard Disk Drive (HDD), or the like. The memory 906 may include a non-transitory computer readable medium that stores instructions for execution by the processor 902. One or more modules within the computing system 900 may be partially or wholly embodied as software and/or hardware for performing any functionality described herein. Different types of memory may be used for different data storage needs. For example, in certain examples the processor 902 may boot from ROM, maintain nonvolatile storage in an HDD, and execute program code stored in RAM.

The SMT solver accelerator 908 is an accelerator for solving an SMT, such as a JSSP. The SMT solver accelerator 908 is separate from the processor 902 and from the memory 906. The SMT solver accelerator 908 may be implemented using any suitable configuration, such as that previously described for FIG. 6.

Figure 10:
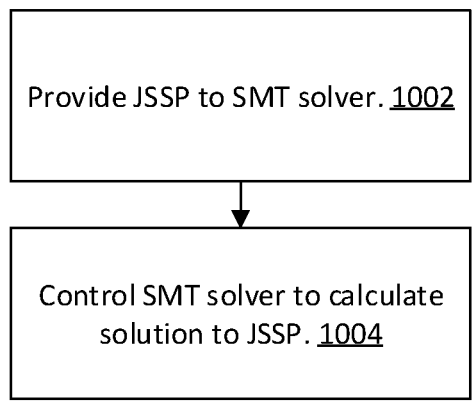
FIG. 10 is a diagram of an SMT solving method, according to some implementations.

FIG. 10 is a diagram of a SMT solving method 1000, according to some implementations. The SMT solving method 1000 may be performed by the processor 902 (see FIG. 9) as part of solving an SMT. For example, the SMT solving method 1000 may be performed as part of solving a JSSP.

The processor 902 performs a step 1002 of providing a JSSP to the SMT solver accelerator 908. The JSSP may be provided by providing values for the SMT solver accelerator 908 to store in its analog CAM cells and dot product engines. The values may be provided to a controller of the SMT solver accelerator 908.

The processor 902 performs a step 1004 of controlling the SMT solver accelerator 908 to calculate a solution for the JSSP. The SMT solver accelerator 908 may iteratively search for a solution to the JSSP, in a similar manner as previously described for FIG. 7. The resulting vector of input variables is a solution for the JSSP, and is provided back to the processor 902, which may store the variables in the memory 906. The variables may be received from the controller of the SMT solver accelerator 908.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A system comprising:
an analog content addressable memory (CAM) device comprising an analog CAM array, the analog CAM array comprising a plurality of analog CAM cells, each of the analog CAM cells configured to store a respective clause of a plurality of expression clauses and to determine whether a respective subset of a plurality of input variables violates the respective clause;
a selector circuit configured to select a candidate variable of the input variables that is violating a largest number of the expression clauses; and
a controller configured to:
perform a test cycle by providing a test vector of the input variables and changing the candidate variable of the input variables in the test vector; and
repeat the test cycle until none of the expression clauses are violated by the test vector of the input variables.

2. The system of claim 1, wherein the analog CAM cells are arranged in analog CAM rows, and the selector circuit comprises:
a clause dot product engine configured to store a weight matrix and to generate a violated clause vector by multiplying the weight matrix with an output vector from the analog CAM rows, the violated clause vector indicating a number of the expression clauses violated by each of the input variables; and
an argmax circuit connected to the clause dot product engine, the argmax circuit configured to indicate a largest value of the violated clause vector to the controller.

3. The system of claim 2, wherein the argmax circuit comprises:
a noise generator circuit configured to add noise to the violated clause vector; and
a winner-takes-all circuit.

4. The system of claim 1, further comprising:
inverters connected to outputs of the analog CAM device, the selector circuit connected to outputs of the inverters.

5. The system of claim 1, wherein the analog CAM cells are arranged in analog CAM rows, and the system further comprises:
a counter circuit configured to count a number of the analog CAM rows with analog CAM cells having expression clauses violated by the input variables.

6. The system of claim 5, wherein the counter circuit comprises:
a row dot product engine configured to store a weight vector, and to generate an analog signal representing the number of the analog CAM rows by multiplying the weight vector with an output vector from the analog CAM rows; and
an analog-to-digital converter connected to the row dot product engine.

7. The system of claim 1, wherein the controller changes the candidate variable by generating a new random value for the candidate variable.

8. The system of claim 1, wherein the controller changes the candidate variable by incrementing the candidate variable.

9. The system of claim 1, wherein the controller changes the candidate variable by decrementing the candidate variable.

10. A method comprising:
mapping a job-shop scheduling problem to expression clauses that are stored in an analog content addressable memory (CAM) array;
perform a test cycle comprising:
searching for a test vector of input variables in the analog CAM array;
selecting a candidate variable of the test vector that is violating a largest number of the expression clauses; and
changing the candidate variable of the test vector; and
repeating the test cycle until none of the expression clauses are violated by the test vector of the input variables.

11. The method of claim 10, wherein selecting the candidate variable of the test vector comprises:
computing a number of the expression clauses violated by each of the input variables of the test vector;
adding noise to the number of the expression clauses for each of the input variables; and
selecting, as the candidate variable, one of the input variables having the largest number of the expression clauses violated.

12. The method of claim 10, wherein changing the candidate variable comprises generating a new random value for the candidate variable.

13. The method of claim 10, wherein changing the candidate variable comprises incrementing or decrementing the candidate variable.

* * * * *